(12) United States Patent
Hoshino et al.

(10) Patent No.: US 6,502,549 B1
(45) Date of Patent: Jan. 7, 2003

(54) ENGINE COMBUSTION CONTROL DEVICE

(75) Inventors: Masatoshi Hoshino, Tsuchiura (JP);
Nobuo Kurihara, Hachinohe (JP);
Minoru Osuga, Hitachinaka (JP);
Toshiharu Nogi, Hitachinaka (JP);
Yutaka Takaku, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/762,689

(22) PCT Filed: Aug. 9, 1999

(86) PCT No.: PCT/JP99/04317
§ 371 (c)(1),
(2), (4) Date: Feb. 12, 2001

(87) PCT Pub. No.: WO00/09876
PCT Pub. Date: Feb. 24, 2000

(30) Foreign Application Priority Data

Aug. 12, 1998 (JP) .......................................... 10-227835

(51) Int. Cl.$^7$ .............................................. F02D 41/14
(52) U.S. Cl. .................. 123/406.41; 701/111; 701/115; 123/406.12; 123/406.58; 123/406.45
(58) Field of Search ........................ 123/406.41, 406.45, 123/406.12, 406.47, 406.48, 406.58, 406.13, 406.65, 406.44; 73/117.3; 701/111, 114, 115

(56) References Cited

U.S. PATENT DOCUMENTS 4,718,382 A * 1/1988 Tanaka .................. 123/406.42
4,744,243 A * 5/1988 Tanaka .......................... 73/115
4,802,454 A * 2/1989 Tanaka .................. 123/406.42
5,604,303 A * 2/1997 Tomisawa et al. ......... 73/117.3

FOREIGN PATENT DOCUMENTS

| JP | 5-118245 | 4/1987 |
| JP | 62-85148 | 4/1987 |
| JP | 63-246444 | 10/1988 |
| JP | 2-83344 | 6/1990 |
| JP | 3-500813 | 2/1991 |

* cited by examiner

Primary Examiner—Hieu T. Vo
(74) Attorney, Agent, or Firm—Crowell & Moring LLP (57) ABSTRACT

A combustion control device for an internal combustion engine, establishes an optimum combustion condition by detecting the combustion pressure in the cylinder and controlling the exhaust gas reflux rate, the ignition timing and the fuel injection timing or the injection rate at the intake stroke in order to improve the fuel economy and the quality of the exhaust gas in the engine. The device is provided with an in-cylinder pressure detector for detecting the in-cylinder pressure in connection with the combustion in the engine, and apparatus for estimating the heat generation rate with respect to the angle of the crank shaft of the cylinder according to the output from the in-cylinder pressure detection means, the ignition timing and the fuel injection timing control the control variables such as EGR control parameters related to the combustion so that the in-cylinder combustion state pattern obtained by the heat generation rate estimation apparatus may be reshaped into a predefined waveform pattern.

8 Claims, 12 Drawing Sheets

FIG. 2

(a) IDEAL PATTERN (b) UNFAVORABLE PATTERN

ENGINE COMBUSTION CONTROL DEVICE

BACKGROUND OF THE INVENTION

The present invention relates to a control apparatus for the internal combustion engine which can establish an optimum combustion by detecting the combustion pressure in the cylinder and controlling the exhaust gas reflux rate, the ignition timing and the fuel injection timing or the fuel injection rate for the intake stroke in order to increase the fuel economy and reduce the release of the regulated components in the exhaust gas.

The statutory regulations regarding fuel consumption and exhaust gasses have been increased in severity in all countries every year. Controlling the ignition timing and the fuel injection amount in response to the actual operational status by microcomputers is commonly used.

In order to optimize the torque and the fuel consumption rate in port-injection type engines, it is known to the skilled in the art that the ignition timing is optimally adjusted so that the angle of the crankshaft for providing the maximum in-cylinder pressure may be at 12 degrees after top dead center (which is disclosed in the article, "Optimal Ignition Timing Feedback Control Method in Spark Ignition Engine", by Fujii and Kawai, et. al. in Preprint Paper Pp. 954, Automotive Engineering Society conference, 1995.) (Hereinafter referred to as "Prior Art 1")

Japanese Patent Application Laid-Open No. 3-233262 (1991) discloses a technology in which the heat efficiency is obtained from the output from the in-cylinder pressure sensor and the engine is operated at the region in which the efficiency of the engine is maintained to be large enough by controlling the EGR rate, the ignition timing and the fuel supply rate. (Hereinafter referred to as "Prior Art 211)

In addition, Japanese Patent Application Laid-Open No. 3-246352 (1991) discloses a technology in which the combustion status such as flameout is detected with a high degree of accuracy by estimating the equivalent workload from the heat release amount and the peak position based on the output from the in-cylinder pressure sensor (Hereinafter referred to as "Prior Art 3")

However, the technology disclosed in Prior Art 1 aims to control the peak position of the in-cylinder pressure, the technology disclosed in Prior Art 2 is based on the heat efficiency of the engine, that is, the relation between the heat generation rate and the heat loss rate, and the technology disclosed in Prior Art 3 aims to obtain the average workload at the combustion stroke from the heat generation amount. Thus, those technologies do not consider explicitly the heat generation rate itself translating the waveform pattern indicating the combustion status. Though it is important to operate the heat generation rate with respect to the crank angle, that is, the pulse width and its peak height of the waveform of the combustion pattern in order to control the combustion (burn) time having a great impact on the engine performance, the prior art described above aim to operate those parameters indirectly, and there remains such a problem that an optimal control can not be always attained.

SUMMARY OF THE INVENTION

The present invention aims to solve the problems in the above described prior art which provides a method for shaping directly the waveform pattern of the heat generation rate. Thus, it will be appreciated that optimal combustion control can be established with less computational complexity by correlating explicitly the manipulated variables and the pattern reshaping, and by controlling the width of the waveform and its peak level independently.

Figure 2:
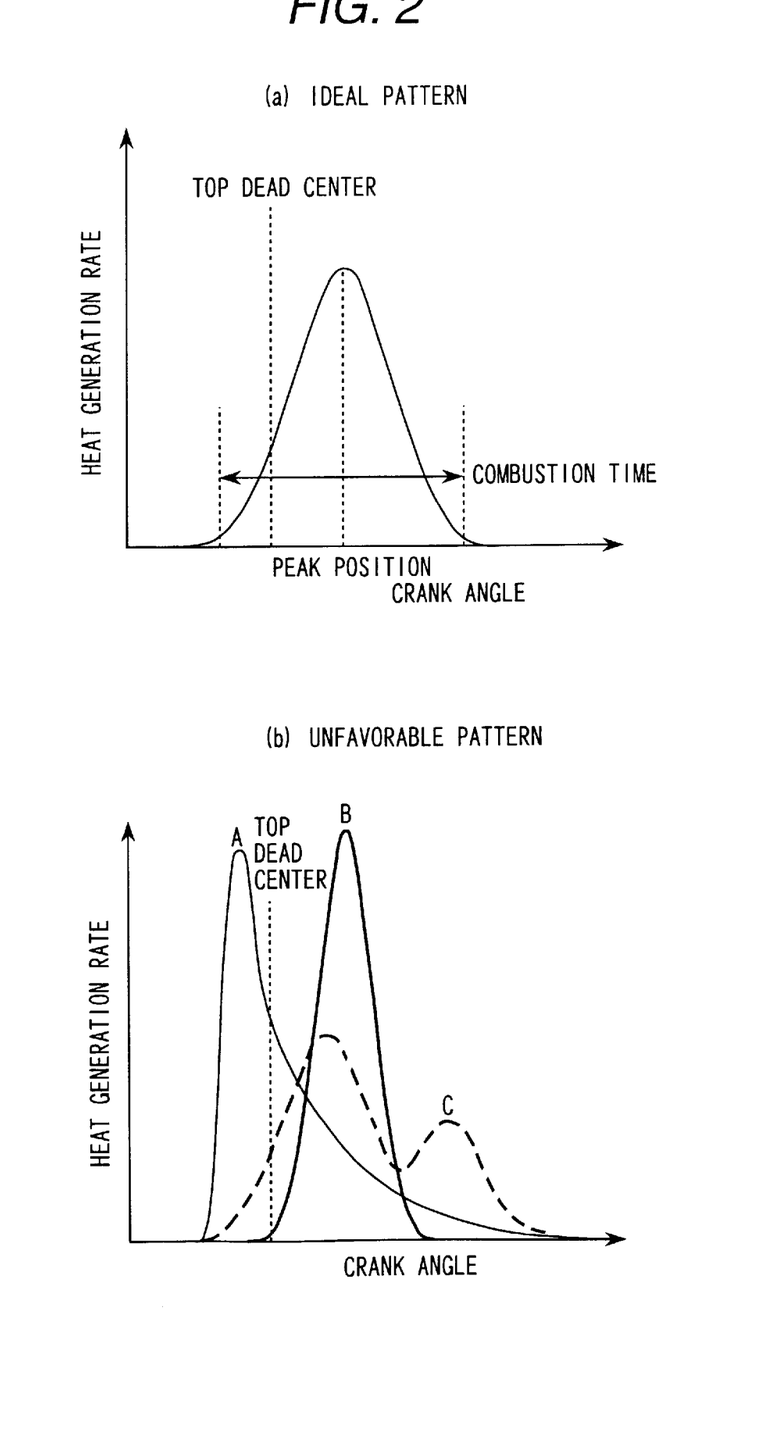
FIG. 2 shows patterns of the heat generation rate with respect to the crank angle as indices for combustion performance.

In either case that there is afterburning in which the burning rate after ignition is slow as shown in FIG. 2(A), the combustion time is short and the peak level of the heat generation is higher as shown in FIG. 2(B) or that there are two or more peaks in the heat generation rate, the heat efficiency decreases and the fuel consumption increases. Thus, gaseous NOx and HC emission as the regulated components increases.

Another object of the present invention is to provide a combustion control device for an internal combustion engine enabling an improvement of the combustion status with less computational complexity based on the heat generation rate of the individual cylinders in service and optimizing the fuel economy and the gaseous emission.

The above object can be achieved by a combustion control device having an in-cylinder pressure detector for detecting the in-cylinder pressure in connection with the combustion in the engine; apparatus for estimating the heat generation rate with respect to the angle of the crank shaft of the cylinder according to the output from said in-cylinder pressure detector; and a controller for controlling a value related to at least either of the ignition timing, the fuel injection timing, the fuel injection ratio for the intake stroke, the in-cylinder gas flow control variable, the EGR control variable, the intake valve timing control variable or the exhaust valve timing control variable so that the in-cylinder combustion state pattern obtained by the heat generation rate estimation apparatus may be reshaped into a predefined waveform pattern.

BRIEF DESCRIPTION OF THE DRAWINGS

These and other features of the invention that will be apparent to those skilled in the art from the following detailed description of the invention, taken together with the accompanying drawings.

DETAILED DESCRIPTION OF THE DRAWINGS

Figure 1:
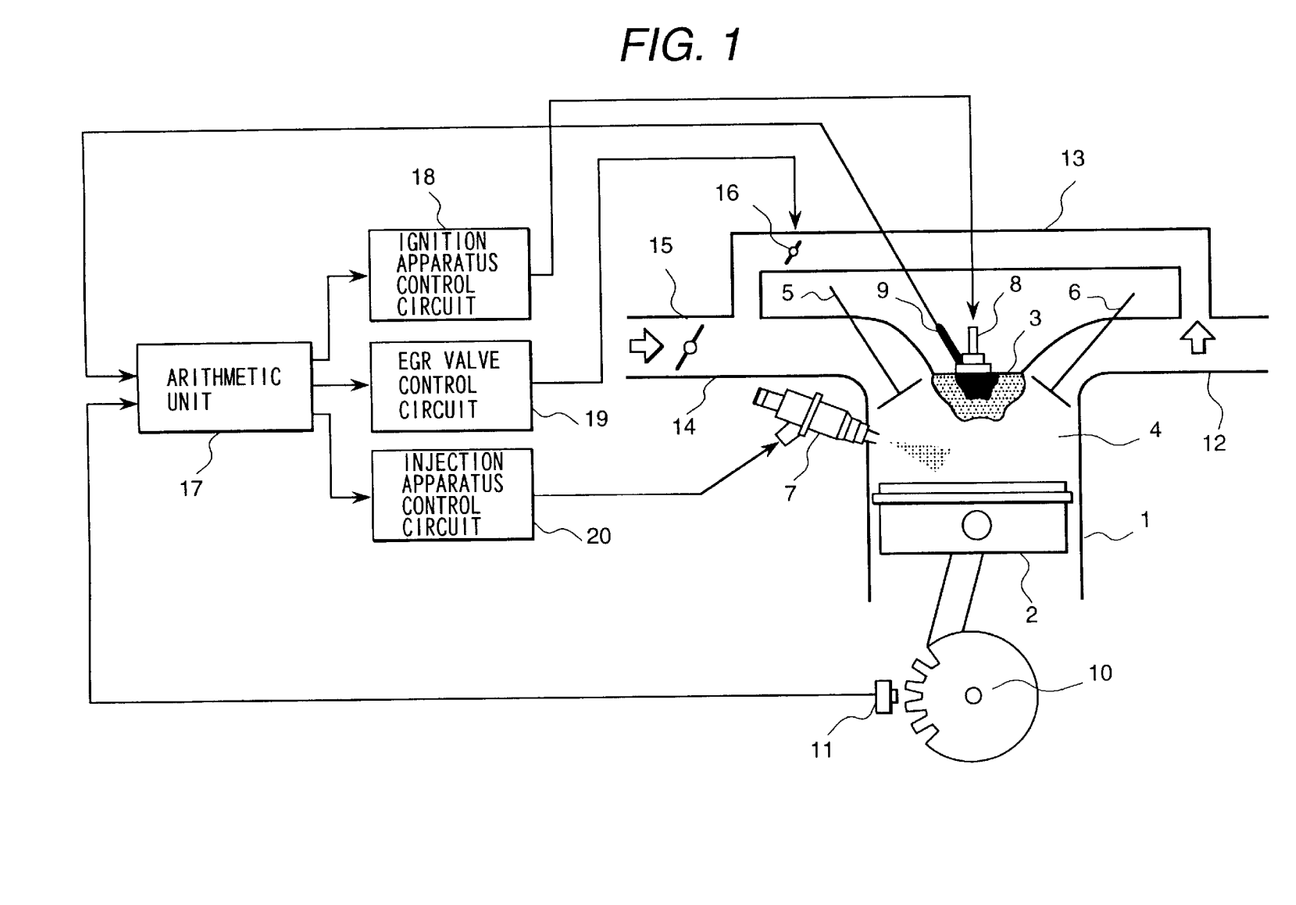
FIG. 1 is a block diagram of an embodiment of a combustion control device according to the present invention.

FIG. 1 shows one cylinder of the 4-cylinder engine with in-cylinder injection in one embodiment of the present invention. The engine 1 includes a combustion chamber 4 composed of a piston 2 and a cylinder 3, and an intake valve 5 and an exhaust valve 6 are installed in the combustion chamber 4. The fuel injection apparatus 7 is located inside the combustion chamber 4, which emits a jet of fuel mainly at the compression stroke of the engine 1. The fuel-air mixture inside the combustion chamber is ignited by the ignition plug B. An in-cylinder pressure sensor 9 for detecting the pressure is installed in the cylinder 3 so that the pressure for the individual cylinder may be measured for the multi-cylinder engine. A rotation sensor 11 for measuring the revolution speed of the engine is installed at the crankshaft 10. A part of the exhaust gas flowing from the combustion chamber 4 to the exhaust pipe 12 is forced to go back to the intake pipe 14 through the reflux duct 13. Owing to this configuration, the combustion speed and the combustion temperature can be reduced, and then, NOx emission can be reduced. The ratio of the air flow through the throttle valve 15 to the reflux gas flow is controlled by the EGR valve 16. The signals from the in-cylinder pressure sensor 9 and the rotation sensor 11 mounted at the crankshaft 10 are supplied as input to the arithmetic unit 17, and the arithmetic unit 17 generates control commands to the ignition apparatus control circuit 18, the EGR control circuit 19 and the injection apparatus control circuit 20 by referring to those signals. Though the ignition apparatus 8 and the fuel injection apparatus 7 can be controlled separately for the individual cylinder, the EGR rate maybe controlled for the overall cylinders because the reflux gas is fed back to the upstream portion of the intake pipe before the branch of the intake pipe 14 to the individual cylinders.

FIG. 2 shows the change in the heat generation rate with respect to the crank angle. The heat generation rate can be estimated from the signal from the in-cylinder pressure sensor and the stroke volume as in the following equation;

$$\frac{dQ(\theta)}{d\theta} = A\frac{K(\theta)}{K(\theta)-1}P(\theta)\frac{dV(\theta)}{d\theta} + \frac{A}{K(\theta)-1}V(\theta)\frac{dP(\theta)}{d\theta}$$

A: mechanical equivalent of heat, K( ): ratio of specific heat, V( ): stroke volume, and P( ): in-cylinder pressure.

The ratio of specific heat can be determined by the air fuel ratio, and thus, considered to be constant with respect to the crank angle. The differential values for the stroke volume and the crank angle are obtained from the basic specifications of the engine. By referring to those parameters stored in ROM as data in the arithmetic unit 17, the heat generation rate used as the combustion control can be calculated easily from the in-cylinder pressure. An ideal pattern for the heat generation rate is shown in FIG. 2(a) in which the heat generation rate increases smoothly immediately after the ignition time, its peak is delayed from TDC (Top Dead Center) by 5 to 10 degrees in the crank angle, and then, the heat generation rate decreases as the termination of ignition and combustion processes. It is preferable for the pattern to be symmetrical and extend its combustion time in 20 to 30 degrees. However, for in-cylinder injection engines, the combustion speed is higher and it is often the case that the peak position is shifted before the top dead center as shown in FIG. 2(b). If EGR is operated in order to make the combustion speed slower and make the combustion pattern closer to the pattern shown in FIG. 2(a), a couple of peaks occurs in the pattern as indicated by dash-line C, in which the second combustion does not make effective work.

Even in case the peak position is optimized but with shorter combustion time, the cooling loss is larger and the overall efficiency may decrease.

Figure 3:
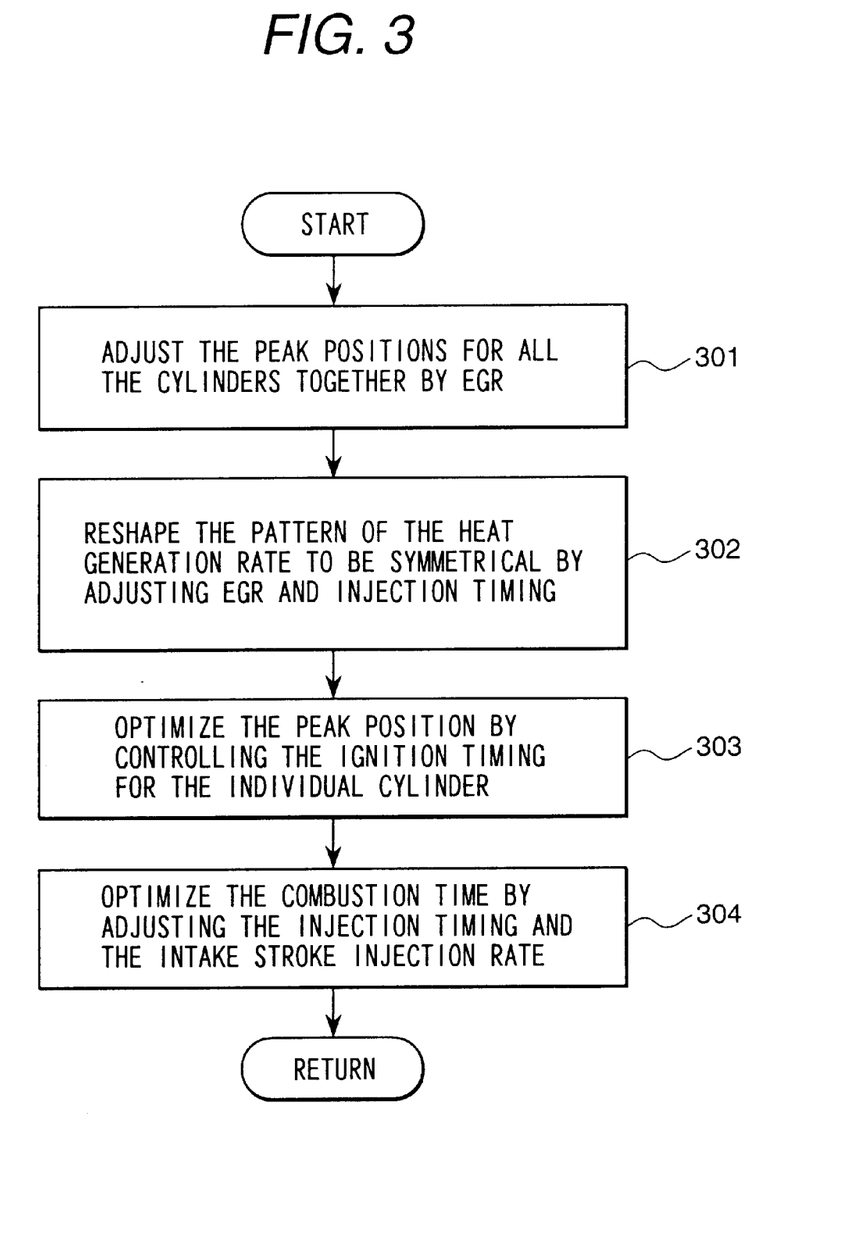
FIG. 3 is a flowchart describing the procedural steps for optimizing the heat generation rate.

The outline of the procedures for making the pattern shown in FIG. 2(b) closer to the ideal pattern in FIG. 2(a) is shown in the flowchart in FIG. 3. Those procedures are executed by referring to the program stored in the ROM of the arithmetic unit 17. The basic philosophy is to adjust roughly the heat generation rate pattern for the overall cylinders by using EGR at first, and then to reflect the differences in the individual cylinders by controlling the ignition timing and the injection timing individually controllable for the each cylinder. At first, in Step 301, the peak position of the heat generation rate for the individual cylinder is shifted by EGR, for example, to the position 5 to 10 degrees after the top dead end. In case that the heat generation rate has such a pattern as shown in FIG. 2(b) in which a couple of peaks occur as a result of the procedure described above, EGR and the injection timing are adjusted in Step 302 and the pattern is so reshaped as to be symmetrical.

Next, in Step 303, the ignition timing is adjusted individually for the each cylinder, and the peak position for the individual cylinder is optimized. In the last step, Step 304, by adjusting the injection timing and the injection rate for the intake stroke, the combustion time for the individual cylinder is optimized, and finally the pattern shown in FIG. 2(a) can be obtained. In addition, as the ideal pattern for the heat generation rate is subject to the engine speed and the engine load, plural ideal patterns for the different conditions are prepared and selected according to the actual operation conditions.

Figure 4:
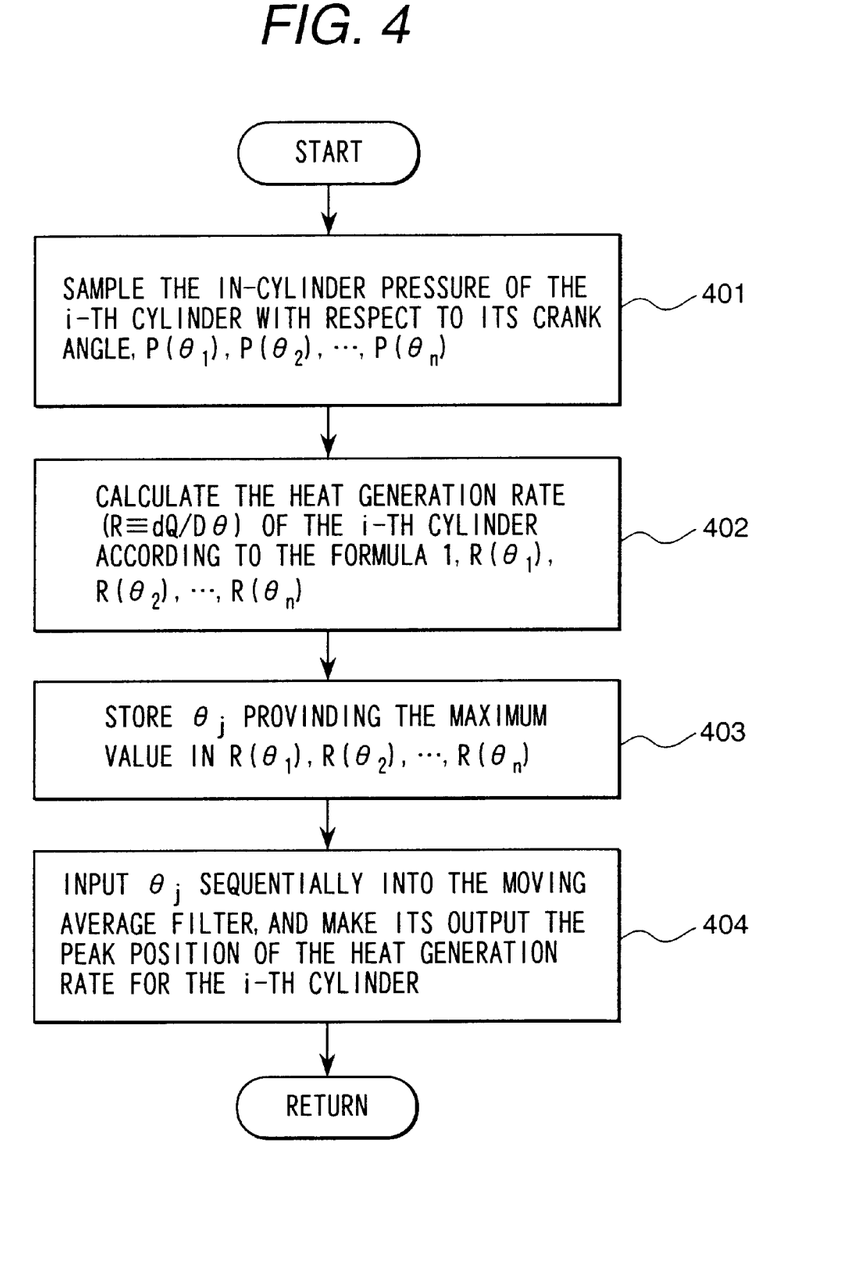
FIG. 4 is a flowchart describing the procedural steps for calculating the peak position of the heat generation rate.

FIG. 4 is a flowchart for calculating the peak position in the heat generation rate at any cylinder. In Step 401, the output from the in-cylinder pressure sensor is sampled as P(θ1), P(θ2), and P(θn) at θ1 for the time immediately after the ignition to θn for the time the ignition completes and the pressure reduces. For example, n is 10, and θn is defined to be 60 degrees after the ignition. Next, in Step 402, the heat generation rates R(θ1), R(θ2), and R(θn) for the individual sampled angles are calculated by applying the sampled data into the formula 1. In Step 403, the crank angle θi for providing the maximum heat generation rate is stored in the arithmetic unit 17. As the combustion operation in the engine is intermittent, the in-cylinder pressure changes at every explosion even for the identical cylinder. As the stored crank angle θi contains many noises, and hence, higher accuracy can not established only by a single measurement, the moving average for the explosions in 10 times is defined to be a peak position (in Step 404). In addition, the combustion time is obtained from the in-cylinder pressures P(θ1), P(θ2), and P(θn) sampled with respect to the crank angle, in the similar manner to the peak position. The heat generation rates R(θ1), R(θ2), and R(θn) for the individual sampled angles are calculated by applying those data into the formula 1. The combustion time is defined to be the range of the crank angle in which the resultant heat generation rate is greater than a predefined constant value. The moving average is used for removing the effect brought by the difference due to the individual explosions also in this case.

Figure 5:
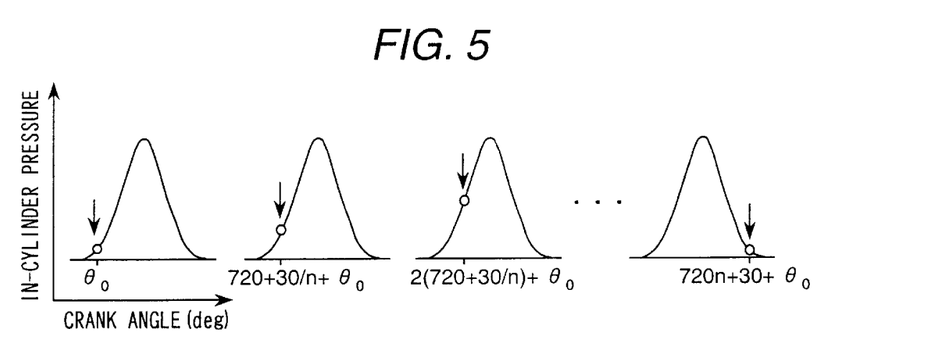
FIG. 5 is an explanatory drawing for showing the method for sampling the data from the in-cylinder pressure sensor.

At least 10 measurement data of in-cylinder pressure for a single explosion are required in order to obtain the pattern of the heat generation rate. The combustion time for a single explosion is approximately equivalent to 30 degrees, which is approximately 8.3 ms in time domain for 600 rpm idling operation. Depending upon the performance of the arithmetic unit 17, it may be difficult to calculate the peak position of the heat generation rate by sampling 10 or more outputs from the in-cylinder pressure sensor every time the explosion occurs. In order to overcome this difficulty, as shown in FIG. 5, the sampled in-delay pressure data can be obtained equivalently for a single explosion by sampling only one measurement data for a single explosion and shirting the sampling timing with delay for the individual sampling. In FIG. 5, assuming that n=10, a sampling data can be obtained equivalently for 10 explosions with a single measurement, and thus, the computational complexity can be reduced to be ¹⁄₁₀. However, as the error increases for the transitional state of the engine, the measurement error can be reduced by selecting the measurement timing to be the time when the rotation and load in the engine changes little, for example, when idling or cruising in a constant speed. It is allowed to sample the in-cylinder pressure data and optimize the heat generation rate only when the engine is idled or the vehicle is operated in a designated condition in order to simplify the computational operation. In this case, some increase in the error may occur under the operation condition different from the condition under which the optimization is performed.

Next, the procedures for optimizing the heat generation rate shown in the flowchart of FIG. 3 are described in detail.

Figure 6:
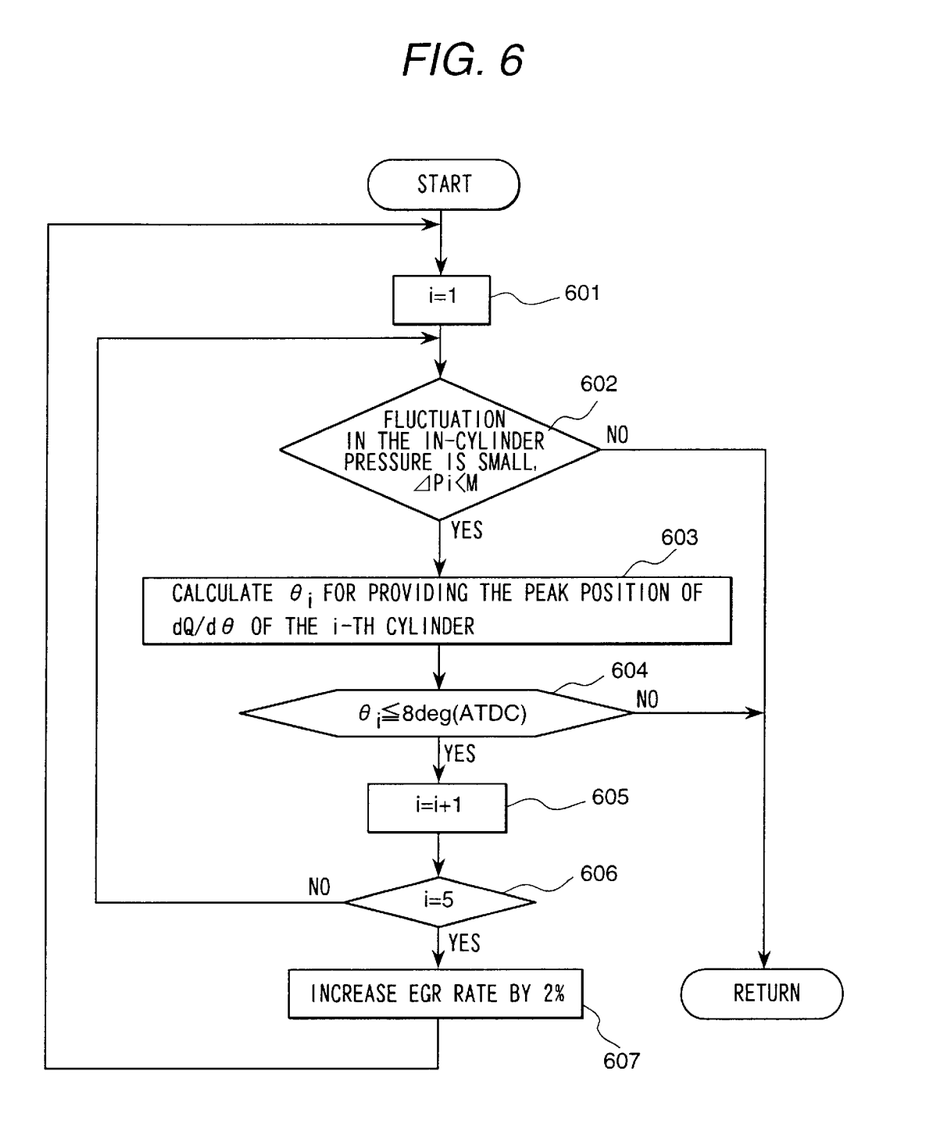
FIG. 6 is a flowchart describing the procedural steps for EGR control for improving the pattern of the heat generation rate.
Figure 7:
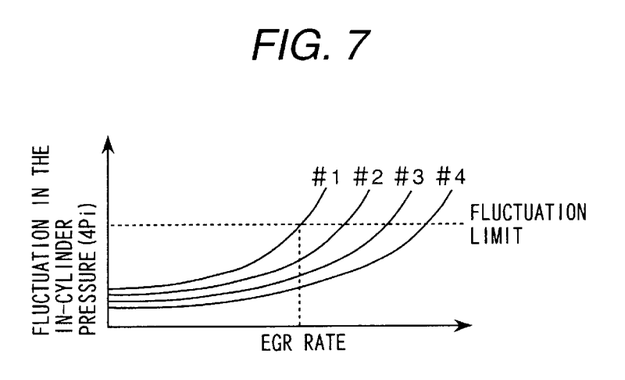
FIG. 7 is an explanatory drawing for showing the relationship between the EGR rate and the fluctuation in the engine rotation for the individual cylinder.

A flowchart for EGR control is shown in FIG. 6. This procedure is aimed to reduce the combustion speed by increasing stepwise the EGR rate in the pattern in which the combustion speed is too fast in the pattern A as shown in FIG. 2(*b*). Assuming that a four-cylinder engine is used, the engine rotation fluctuation and the peak position in the heat generation rate are calculated for the individual cylinder from its in-cylinder pressure. Step 601 is for initializing the data, and the subsequent steps are applied for the individual cylinder. Though it is possible to increase the EGR rate and reduce the combustion speed, the fluctuation in the in-cylinder pressure may increase depending on the cylinders as shown in FIG. 7. The EGR rate is made to increase so that the fluctuation in the cylinder having the maximum fluctuation value may not exceed the predefined range defined based on drivability and riding comfort. As the fluctuation in the in-cylinder pressure can be measured as the fluctuation in the engine rotation, it is allowed to calculate the fluctuation from the measured signal from the rotation sensor mounted on the crankshaft. The fluctuation in the in-cylinder pressure is evaluated in Step 602, and if the fluctuation exceeds the predefined level, this procedure is terminated. In Step 603, the peak position in the pattern of the heat generation rate is calculated. If the peak position is judged to be more than 8 degrees after the top dead center, this procedure is terminated in Step 604. Step 605 is to increment the counter for specifying the cylinder to be processed next. If all the peak positions of the heat generation rate for all the cylinders are judged to be within, for example, 8 degrees after the top dead center in Step 606, Step 607 is selected consecutively for increase the EGR rate, for example, by 2% in order to reduce the combustion speed, and then, the overall procedures described above are repeated again.

Figure 8:
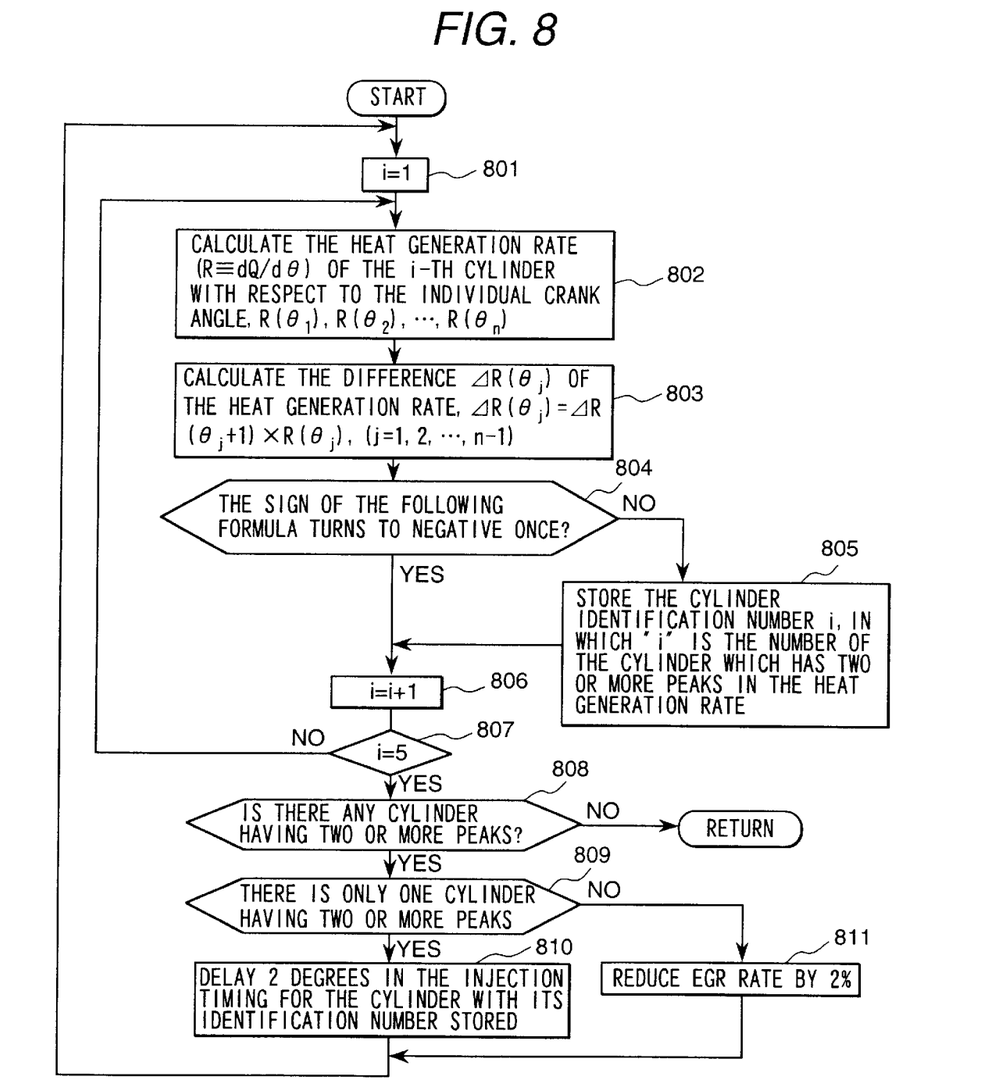
FIG. 8 is a flowchart describing the procedural steps for reshaping the pattern of the heat generation rate.

In case a couple of peaks occurs as shown in the pattern C in FIG. 2(*b*) as a result of EGR control described above, the pattern of the heat generation rate is adjusted by the procedure shown in the flowchart of FIG. 8. Step 801 is an initialization step and the subsequent steps are applied to the individual cylinder. At first, in Step 802, the heat generation rate is calculated for the individual crankshaft angle. In Step 803, the difference for the crankshaft angle is calculated. in Step 804, the number of changes in the sign of the difference is counted. That is, the adjacent differences for the crankshaft angle are multiplied to each other, and if the multiplication result is negative, the change in the sign of the difference is considered. If there are plural changes in the sign of the difference, that is, plural peaks in the heat generation rate, the identification number of the corresponding cylinder is stored in the memory in Step 805. Step 806 increments the counter to continue the procedure for the next cylinder. The number of peaks in the heat generation rate is counted for all the cylinders in Step 807, if it is judged that all the cylinder have a single peak in the heat generation rate, the procedure is terminated in Step 808. If it is judged in Step 809 that there is only one cylinder having 2 or more peaks in the heat generation rate, the injection timing for the relevant cylinder is delayed, for example, by 2 degrees in Step 810, and thus, its pattern is reshaped by increasing the combustion speed so as to have a single peak in the heat generation rate. In case that there are two or more cylinders having 2 or more peaks, as it is difficult to reshape the pattern for the individual cylinders, the EGR rate is reduced, for example, by 2% in Step 811, and thus, the combustion speed for all the cylinders is increased all together. Those procedures are repeated in a designated period.

Figure 9:
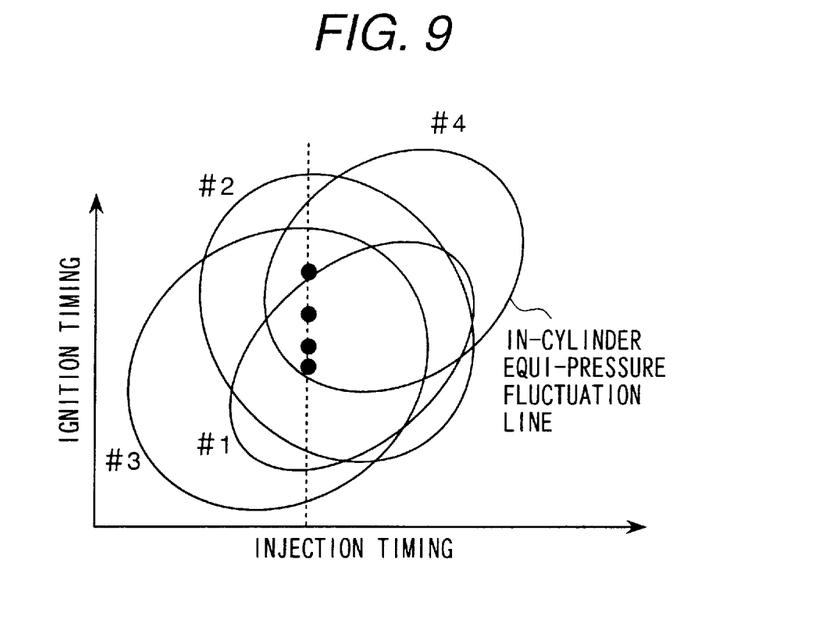
FIG. 9 is an explanatory drawing for showing the method for determining the ignition timing for the individual cylinder.
Figure 10:
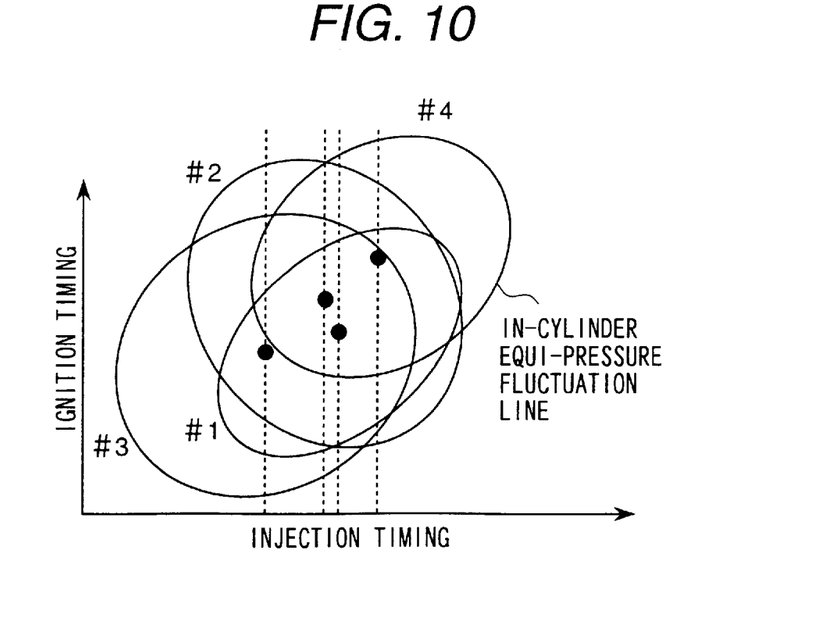
FIG. 10 is an explanatory drawing for showing the method for determining the injection timing for the individual cylinder.

As the pattern of the heat generation rate in the individual cylinder may be reshaped approximately to be the pattern shown in FIG. 2(*a*) as a result of the procedures described above, what are taken next are the procedures for optimizing the torque and fuel consumption by controlling the peak position and the combustion time for the individual cylinders. Taking the parameters to be ignition timing and injection timing, the in-cylinder equi-pressure curve in which the fluctuation in the in-cylinder pressure is constant for the individual cylinder can be illustrated as shown in FIG. 9. Though the position and shape of the in-cylinder equi-pressure curve may change depending on the fuel injection apparatus for the individual cylinder, it is found that the ideal pattern can be provided in which the fluctuation in the engine rotation can be minimized and also the heat generation rate is ideally adjusted when operating the engine near the center of the in-cylinder equi-pressure curve. Though common settings for the ignition timing and the injection timing are applied to all the cylinders in the initial state because the individual difference of the cylinders and the injection apparatus is unknown, the ignition timing is adjusted at first so that the operation condition of the individual cylinder may be located as close as possible to the center of the in-cylinder equi-pressure curve as shown in FIG. 9. Next, the injection timing is adjusted to control the combustion time as shown in FIG. 10 so that the operation condition of the individual cylinder may be located around the center of the in-cylinder equi-pressure curve. Thus, the pattern of the heat generation rate as shown in FIG. 2(a) can be obtained. As to what extent ignition timing and injection timing can contribute to the reduction of the fluctuation in the in-cylinder pressure may not be understood explicitly in the actual operation conditions, it may be difficult to determine the ignition timing and injection timing by referring to the fluctuation in the in-cylinder pressure. It will be appreciated that the fuel economy and the quality of the gas exhaust can be increased as well as the fluctuation in the in-cylinder pressure can be reduced by controlling the peak position of the heat generation rate and the combustion time so as to be a designated pattern by adjusting the ignition timing and the injection timing for the individual cylinder.

Figure 11:
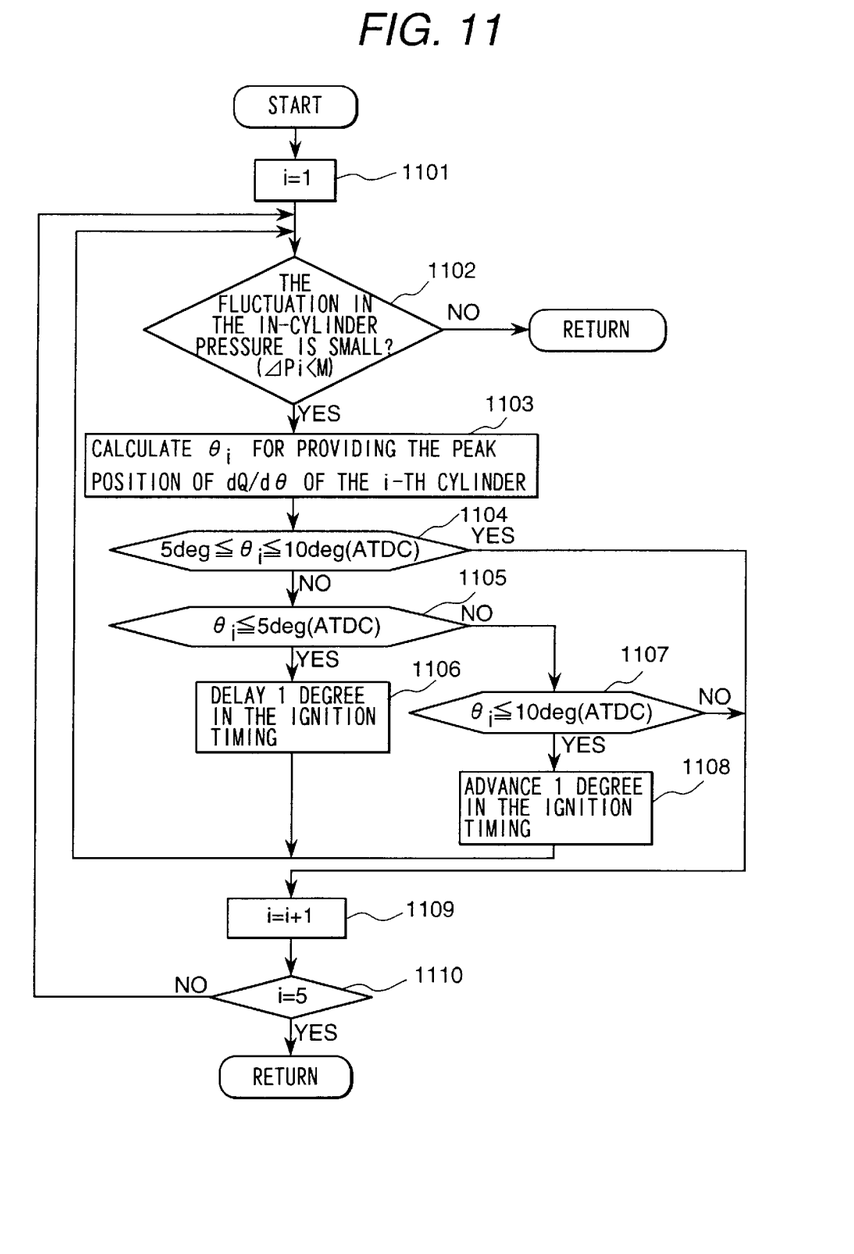
FIG. 11 is a flowchart describing the procedural steps for ignition timing control for the individual cylinder.

FIG. 11 is a flowchart showing the procedural steps for controlling the ignition timing. Step 1101 is for initializing the data so that the subsequent steps may be applied for the individual cylinder. If the fluctuation in the in-cylinder pressure is judged to be larger than a designated value in Step 1102, the procedure is terminated. The peak position of the heat generation rate is calculated in Step 1103. If the peak position and the combustion time are judged in Step 1104 to be located within relevant ranges, no further steps are applied to the relevant cylinder. If the peak position is judged to be delayed in Step 1107, Step 1108 is selected next, in which the ignition timing is advanced by a definite angle, for example, 1 degree, and otherwise, the ignition timing is delayed by a definite angle, for example, 1 degree in Step 1106. By repeating those procedural steps, the peak positions of all the cylinders can be located within adequate regions. In Step 1109, the counter is incremented to apply the procedure for the next cylinder. Now that the peak positions of all the cylinders can be located within adequate regions, escaping Step 1110, the procedure is terminated.

Figure 12:
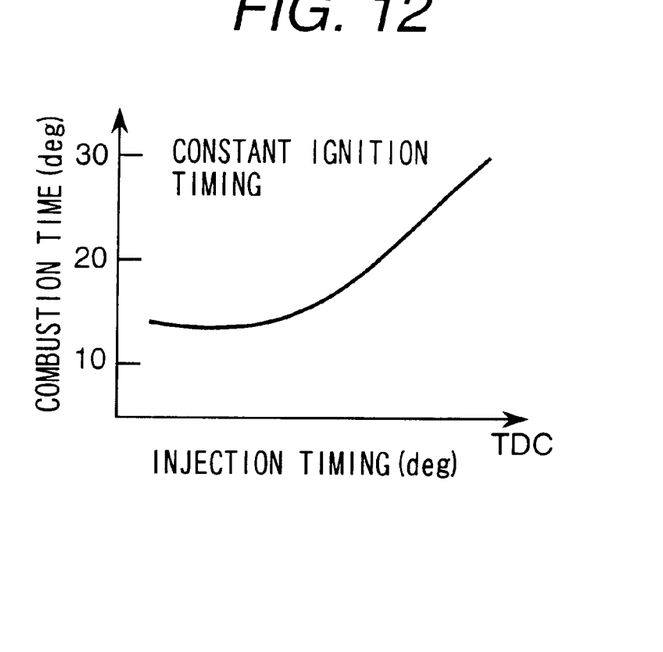
FIG. 12 is an explanatory drawing for showing the relationship between the injection timing and the combustion time.
Figure 13:
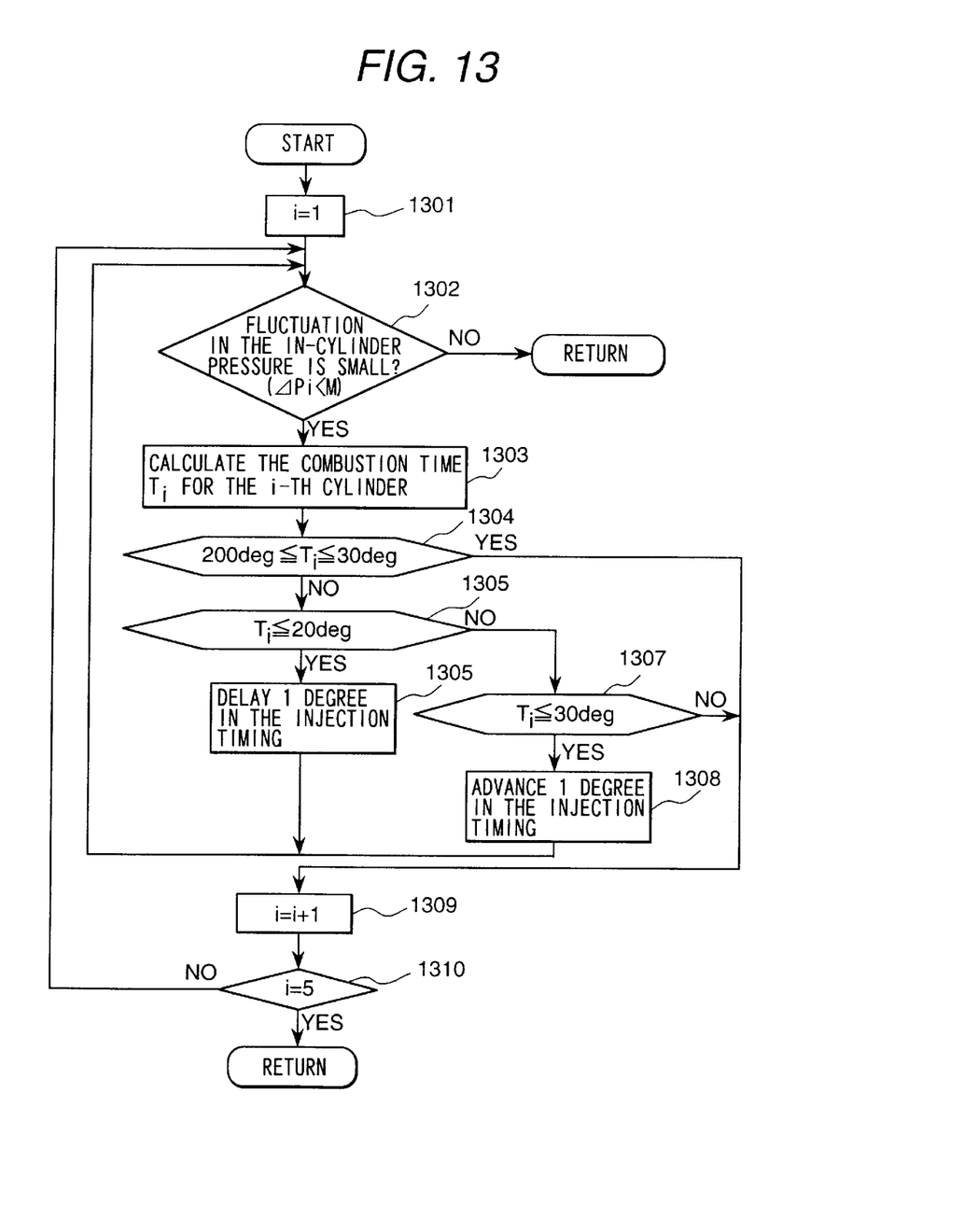
FIG. 13 is a flowchart describing the procedural steps for injection timing control for the individual cylinder.

There is a monotonic relationship between the combustion time and the injection timing as shown in FIG. 12. The procedural steps shown in FIG. 13 attempt to adjust the combustion time by using this relationship. Step 1301 is for initializing the data so that the subsequent steps maybe applied for the individual cylinder. The fluctuation in the in-cylinder pressure is evaluated in Step 1302, and if it is judged to be larger than a designated value, the procedure is terminated. If the fluctuation in the in-cylinder pressure is judged to be within the designated value, the combustion time for the individual cylinder is estimated in Step 1303 as the time in terms of crank angle with which the heat generation rate reaches and holds a predefined constant value or higher. If the estimated combustion time is judged to be within an adequate range, no further procedure is applied to the corresponding cylinder in Step 1304. If the combustion time is judged in Step 1305 to be shorter, the injection timing of the corresponding cylinder is delayed by a definite angle, for example, 1 degree in Step 1306; and if it is judged in Step 1307 to be longer, its injection timing is advanced by a definite angle, for example, 1 degree in Step 1308. By repeating those procedural steps, the combustion time of all the cylinders can be located within adequate regions. In Step 1309, the counter is incremented to apply the procedure for the next cylinder. Now that the combustion time of all the cylinders can be made located within adequate regions, escaping Step 1310, the procedure is terminated.

Figure 14:
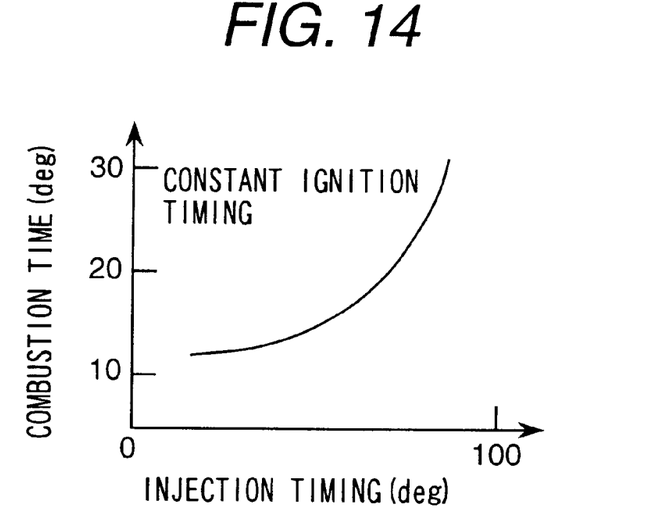
FIG. 14 is an explanatory drawing for showing the relationship between the intake stroke injection rate and the combustion time.
Figure 15:
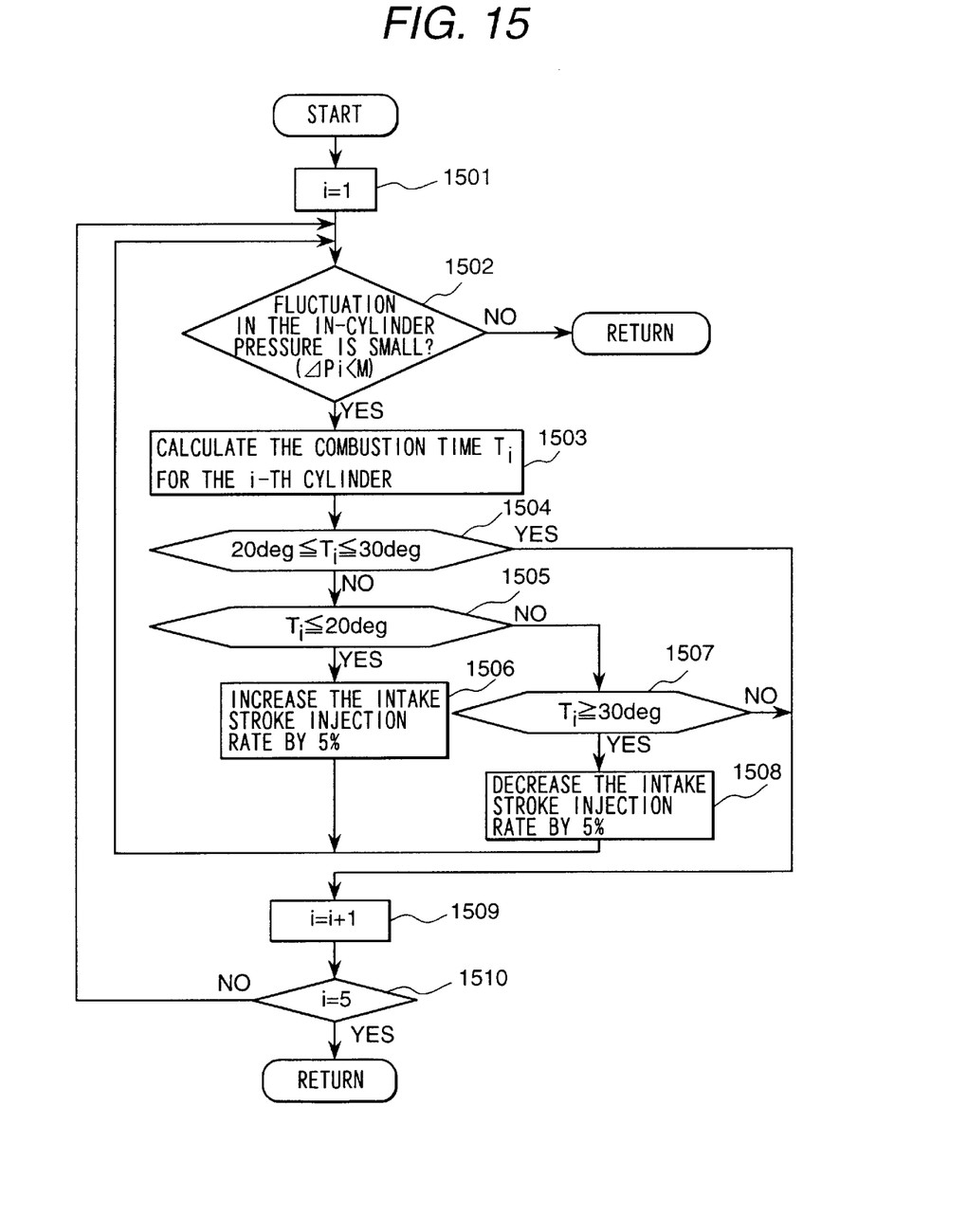
FIG. 15 is a flowchart describing the procedural steps for the intake stroke injection rate control for the individual cylinder.

In in-cylinder injection engines, it is often the case that the fuel injection operation is performed at two stages in order to increase the fuel economy, the quality of the gas emission as well as the ignition performance, in which the ignition operation is performed also at the intake stroke in addition to the compression stroke. The fraction of fuel injected at the intake stroke to the overall fuel injected in a single cycle is designated "intake stroke injection rate". There is a monotonic relation between the combustion time and the intake stroke injection rate as shown in FIG. 14. The procedural steps shown in FIG. 15 are performed according to this relationship. Step 1501 is for initializing the data so that the subsequent steps may be applied for the individual cylinder. The fluctuation in the in-cylinder pressure is evaluated in Step 1502, and if it is judged to be larger than a designated value, the procedure is terminated. If the fluctuation in the in-cylinder pressure is judged to be within the designated value, the combustion time for the individual cylinder is estimated in Step 1503 as the time in terms of crank angle with which the heat generation rate reaches and holds a predefined constant value or higher. If the estimated combustion time is judged to be within an adequate range, no further procedure is applied to the corresponding cylinder in Step 1504. If the combustion time is judged in Step 1505 to be shorter, the intake stroke injection rate of the corresponding cylinder is increased by a definite value, for example, 5% in Step 1506; and if it is judged in Step 1507 to be longer, its intake stroke injection rate is decreased by a definite angle, for example, 5% in Step 1508. By repeating those procedural steps, the combustion time of all the cylinders can be located within adequate regions. In Step 1509, the counter is incremented to continue the procedure for the next cylinder. Now that the combustion time of all the cylinders can be located within adequate regions, escaping Step 1510, the procedure is terminated.

According to the present invention, it will be appreciated that the combustion time for the individual cylinder influencing the engine performance can be directly controlled by adjusting the heat generation rate with respect to the crank angle, that is, the width and peak level in the waveform of the fuel combustion pattern. Owing to this procedure, the fuel economy and the quality of exhaust gas can be improved as well as the degradation in the fuel economy and the gas emission quality can be avoided with respect to the individual difference of the cylinders of the engine and their aged deterioration, which ultimately establishes an optimum combustion control.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A combustion control device for an internal combustion engine comprising:

an in-cylinder pressure detection means for detecting in-cylinder pressure in connection with combustion in an engine;

means for estimating heat generation rate with respect to an angle of a crank shaft of a cylinder according to output from said in-cylinder pressure detection means;

control means for controlling a value related to at least either of ignition timing, fuel injection timing, fuel injection ratio for an intake stroke, an in-cylinder gas flow control variable, an EGR control variable, an intake valve timing control variable or an exhaust valve timing control variable so that an in-cylinder combustion state pattern obtained by said heat generation rate estimation means may be reshaped to a predefined waveform pattern.

2. A combustion control device of claim 1, wherein combustion state control by said control means is made to continue while an index regarding to combustion stability of said engine indicates a more preferable value than a predefined value.

3. A combustion control device of claim 1, wherein means is provided for sampling a signal waveform at a designated crank angle shifted for every designated rotation, and said waveform pattern is reconstructed with a designated angle from an ignition timing of said engine as long as said in-cylinder combustion state waveform pattern is located within a limit of a predefined steady state operation.

4. A combustion control device of claim 3, wherein said sampling means for sampling said in-cylinder combustion state waveform pattern is operative with said engine in an idle state.

5. A combustion control device of claim 3, wherein said in-cylinder combustion state waveform pattern is preselected to be equivalent to a steady state operation based on a sampling result in an idle state.

6. A combustion control device of claim 1, wherein said in-cylinder combustion state waveform pattern is preselected to be equivalent to a steady state operation based on a sampling result in said idle state.

7. A combustion control device of claim 1, wherein said predefined waveform pattern is symmetrical with respect to a peak position thereof.

8. A combustion control device of claim 7, wherein said predefined waveform pattern has a peak position at 35 degrees after top dead center in terms of crank shaft angle and a width with which a level of said pattern is larger than a designated value is from 20 degrees to 40 degrees in term of the crank shaft angle.

* * * * *